United States Patent
McAden

(10) Patent No.: US 6,722,388 B1
(45) Date of Patent: Apr. 20, 2004

(54) MULTIPLE PRESSURE REGULATOR

(76) Inventor: Robert A. McAden, 6965 Oak Valley Dr., Colorado Springs, CO (US) 80919

( * ) Notice: Subject to any disclaimer, the term of this patent is extended or adjusted under 35 U.S.C. 154(b) by 0 days.

(21) Appl. No.: 09/514,914

(22) Filed: Feb. 28, 2000

(51) Int. Cl.[7] ............................................. F16K 43/00
(52) U.S. Cl. ..................... 137/454.5; 73/1.72; 73/199; 137/315.03; 137/315.04; 137/505.12; 137/505.13; 137/505.18; 137/557; 137/883; 123/506; 123/514
(58) Field of Search ........................... 137/454.5, 454.6, 137/505, 505.13, 505.42, 315.03, 315.04, 505.11, 505.12, 557, 883; 73/1.57, 1.72, 199; 123/506, 514

(56) References Cited

U.S. PATENT DOCUMENTS

| | | | |
|---|---|---|---|
| 1,524,852 A | * 2/1925 | Woodead ................... 137/454.5 |
| 2,195,728 A | * 4/1940 | Jones ....................... 137/454.5 |
| 2,600,650 A | * 6/1952 | Hieger ..................... 137/454.5 |
| 2,618,908 A | * 11/1952 | Salter et al. ............. 137/315.04 |
| 2,756,936 A | * 7/1956 | Mueller et al. ............ 137/510 |
| 3,451,431 A | * 6/1969 | Boyer ...................... 137/454.5 |
| 4,174,733 A | * 11/1979 | Eidsmore et al. .......... 137/883 |
| 4,894,988 A | * 1/1990 | Hoppenjans ................. 60/418 |
| 5,282,493 A | * 2/1994 | Schwartz et al. ............ 137/505 |
| 5,303,733 A | * 4/1994 | Nelson ..................... 137/883 |
| 5,462,030 A | * 10/1995 | Shinogle ................... 123/457 |
| 5,465,750 A | * 11/1995 | Wang ...................... 137/505.12 |
| 5,501,247 A | * 3/1996 | Miller ..................... 137/316 |
| 5,520,206 A | * 5/1996 | Deville .................... 137/505.12 |
| 5,590,683 A | * 1/1997 | Bennett .................... 137/454.5 |
| 5,598,869 A | * 2/1997 | Nelson ..................... 137/505.12 |
| 5,603,348 A | * 2/1997 | Geringer ................... 137/514.7 |
| 5,755,254 A | * 5/1998 | Carter et al. .............. 137/340 |
| 6,382,242 B1 | * 5/2002 | Gallant et al. ............. 137/505 |

\* cited by examiner

Primary Examiner—George L. Walton
(74) Attorney, Agent, or Firm—G. F. Gallinger

(57) ABSTRACT

A pressure regulator having a valve cartridge adapted to be removably held within its housing, said cartridge having a frame carrying and positioning a valve seat, a valve member, a valve stem, and a spring. The valve cartridge ensures correct spacing between the valve member and the valve seat. Difficulties in pressure regulation may be quickly rectified and pressure flow characteristics may be altered by removing and replacing the valve cartridge. Another aspect of the invention discloses a multiple pressure regulator comprising: a housing adapted to removably house two valve cartridges; an inlet opening into the housing; an outlet opening from the housing; and two valve cartridges adapted to be removably held within the housing. Each of said cartridges similar to those described above. In a preferred aspect of the invention the multiple pressure regulator comprises an inlet manifold to stabilize pressure fluctuations, and said housing is internally plumbed so that a common feed return line can recirculate flow received through the inlet opening, and so that a pressure meter connected thereto may monitor flow pressure on each valve cartridge.

8 Claims, 1 Drawing Sheet

MULTIPLE PRESSURE REGULATOR

FIELD OF INVENTION

This invention relates to pressure regulators. More particularly this invention relates to a multiple pressure regulator having a removable cartridge containing a valve and seat having particular application for enriching fuel mixtures in racing.

BACKGROUND OF THE INVENTION

The applicant designs and markets racing fuel systems. Regulators used to enrich fuel mixtures in racing generally comprise a stack up of components within a regulator housing. They are dependent on proper and intricate assembly for proper function. Frequently they must be returned to the manufacture for service. In the field users frequently need to adjust and tune the flow and pressure characteristics of the unit. No adjustment can be readily made without unstacking and subsequently restacking intricate and easily lost small parts. Another problem with a stack up design is the necessity of precise spacing between the metering valve member and the valve seat; this distance must be recalibrated each time the stack is replaced after inspection or removal. There is no assurance that this distance will be invariably correct.

Another problem commonly experienced is pressure creep. Pressure creep is generally caused by faulty valve to seat alignment. Some designs attach the valve stem to a flexible diaphragm. Diaphragm flexing may cause misalignment. Any misalignment causes pressure creep. All known pressure regulator designs interpose valve guides and a biasing spring in the fuel flow. Disruption of laminar flow also causes pressure creep. With a stack up regulator these problems cannot be readily rectified.

In racing fuel enrichment systems the current state of the art is to use multiple individual fuel regulators for the injection of different stages. The individual regulators must be individually mechanically supported and mounted. Each individual regulator must be separately supplied with the enriched mixture by a hose which is routed to it. Each individual regulator additionally normally has a return line for circulating the fuel mixture back to the supply tank. This is necessary to prevent pressure build up when the stage is closed and there is minimal flow through the stage pump. To minimize the number of hoses and simplify field installation each regulator may be mounted on a bracket carrying its pump. Individual stage pumps are necessary because flow variations in one regulator would otherwise affect inlet pressure in the other regulators when a stage is opened or closed. A reduced inlet pressure leans the fuel/air mixture and results in engine over heating. Engine over heating damages pistons and valves. If a hole is burnt through a piston detonation of oil in the crankcase can blow pistons out destroying the engine.

OBJECTS AND STATEMENT OF INVENTION

It is an object of this invention to disclose a design for a pressure regulator employing a cartridge carrying a valve, a valve seat, and a biasing means so that common problems in a regulator may be readily rectified by examining or replacing the valve cartridge in the field. The need to intricately stack small parts in an exacting position is eliminated. The necessity to calibrate—and to recalibrate each time the valve member is replaced after inspection or removal—to ensure the precise spacing between the metering valve member and the valve seat is also eliminated. There is assurance that this spacing will be invariably correct. It is a further object of this invention to disclose a design for a pressure regulator which greatly reduces turbulence in flow therethrough. Reduction of turbulence improves flow linearity at varying flow rates and pressures. This facilitates tuning and adjustment in the field. If necessary, an entire cartridge can be replaced to facilitate a substantially different flow rate. Similarly a cartridge can be replaced to facilitate the use of a different enrichment fuel. It is yet a further object of this invention to disclose a multiple pressure regulator. A multiple pressure regulator simplifies field installation by eliminating multiple fuel inlet hoses (and accordingly improving flow laminarity), supply return lines (which are opened when the individual valve solenoids are off), and eliminating multiple mechanical mountings. The possibility of using a multiple fuel regulator is only feasible with the use of valve cartridges in the regulators therein. Without readily replaceable valve cartridges, which dramatically reduce pressure regulator problems and facilitate quick rectification of any problem, the use of a multiple regulator would otherwise result in a multiple of the down time of any one individual regulator; and this would be unacceptable. It is yet a further object of this invention to disclose a multiple pressure regulator which facilitates setup by plumbing pressure gauges and pressure bleeds. (This is done by internally plumbing the multiple pressure regulator and providing openings for the connection of pressure gauges and pressure bleeds on the multiple regulator) (It is necessary to monitor and check the pressure fluctuation as each stage comes on line.) It is a final object of this invention to disclose a fuel enrichment balancing system which is extraordinarily problem free and reliable. A system which can be installed in a fraction of the time, a system which dramatically reduces the necessity of stringing hoses and mechanically supporting pumps. And a system which is much more user friendly and able to be tuned for performance in the field.

One aspect of this invention provides for a pressure regulator of the type having a housing; an inlet into the housing; an outlet from the housing; a valve seat within the housing; a valve member concentrically positioned adjacent to, and adapted to mate with, the valve seat; a valve stem extending perpendicularly from the valve member having a valve end portion adjacent to the valve member and an opposite end portion; a valve bias means; and a valve stem positioning and adjusting means; wherein the improvement comprises: a valve cartridge adapted to be removably held within the housing, said cartridge carrying and positioning the valve seat, the valve member, the valve stem, and the valve bias means; and wherein said housing is adapted to removably contain said cartridge; so that difficulties in pressure regulation may be quickly rectified and pressure flow characteristics may be altered by removing and replacing the valve cartridge.

Another aspect of this invention provides for a multiple pressure regulator comprising: a housing adapted to removably house two valve cartridges; an inlet opening into the housing; an outlet opening from the housing; and two valve cartridges adapted to be removably held within the housing each of said cartridges similar to those described above. With this arrangement difficulties in pressure regulation may be quickly rectified and pressure flow characteristics may be altered by removing and replacing the valve cartridge.

Various other objects, advantages and features of novelty which characterize this invention are pointed out with particularity in the claims which form part of this disclosure.

For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein.

Figure 1:
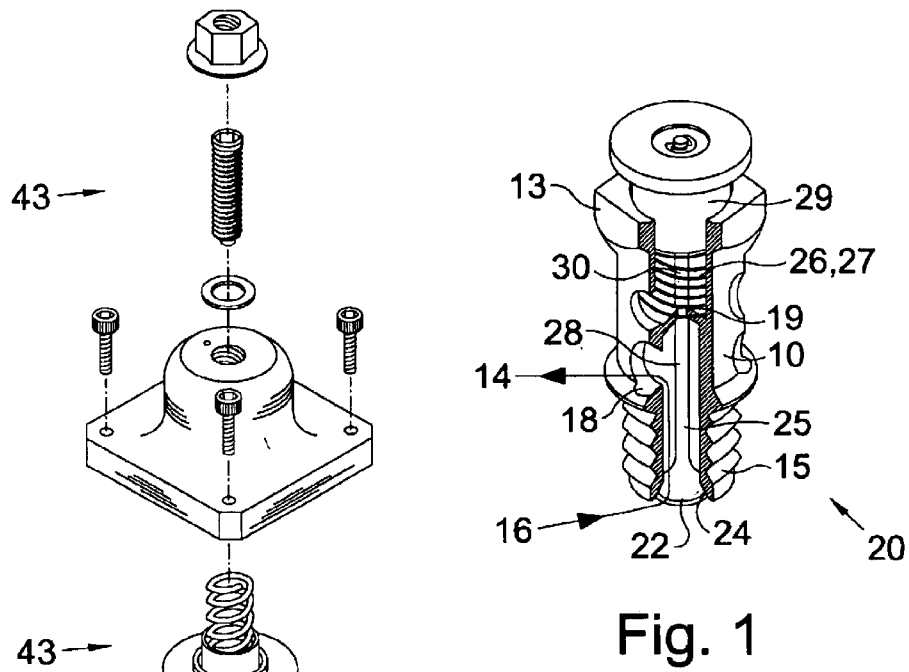
FIG. 1 is an enlarged perspective view of a replaceable valve cartridge comprising a valve member, a valve stem, a seat, and a biasing means. The valve cartridge is used in a pressure regulator.

The following is a discussion and description of the preferred specific embodiments of this invention, such being made with reference to the drawings, wherein the same reference numerals are used to indicate the same or similar parts and/ or structure. It should be noted that such discussion and description is not meant to unduly limit the scope of the invention.

DESCRIPTION OF THE INVENTION

Turning now to the drawings and more particularly to FIG. 1 we have an enlarged perspective view of a replaceable valve cartridge 20 comprising a valve cartridge frame 10 which carries and positions a valve member 22, a valve stem 28, a valve seat 24, and a valve bias means 26. The valve cartridge 20 is removably held in a pressure regulator 40 of the type having a housing 42; an inlet 44 into the housing 42; an outlet 46 from the housing 42; and a valve stem positioning and adjusting means 43 to adjust the pressure. The valve cartridge 20 also maintains the critical spacing between the valve member 22 and the valve seat 24. Difficulties in pressure regulation may be quickly rectified and pressure flow characteristics may be altered by removing and replacing the valve cartridge 20. Using a pressure regulator 40 having a replaceable valve cartridge 20 has a particular advantage in vehicle racing fuel delivery systems where adjustments must be made in the field on a fuel pressure regulator 40 mounted under the hood of a vehicle (not shown) and where any small parts which are dropped are likely to be lost. Use of the valve cartridge 20 also ensures correct spacing between the valve member 22 and the valve seat 24. The valve cartridge 20 eliminates the need to calibrate, and recalibrate this critical spacing each time the valve member 22 is removed for inspection or replacement.

A bias means 26 is intended to include a diaphram 43 to which the valve member 22 is attached so that the valve member 22 will be biased by pressure. Preferably, the valve bias means 26 comprises a spring 27 which is positioned around the valve stem 28. The cartridge 20 has a flow entrance 16 and flow exit 18 arranged so that a flow 14 through the cartridge 20 is not immediately adjacent to the spring 27 and so that turbulence in the flow 14 is minimized. The valve guides 19 are also positioned so that they will not cause turbulence in the flow 14. The valve stem 28 has a valve end portion 25 adjacent to the valve member 22 and an opposite end portion 30. Most preferably the spring 27, and valve guides 19 are positioned around the opposite end portion 30 of the valve stem 28. The flow exit 18 is adjacent to the valve end portion 25 and the flow entrance 16 is around the valve member 22. This arrangement ensures that turbulence in the flow 14 is not caused by the spring 27, or valve guides 19.

Most preferably, a bottom end portion of the cartridge frame 10 is fitted with a male thread 15 and the housing 42 is adapted with a mating female thread to screwably receive the cartridge 20. A tight seal is most preferably ensured by an o-ring 21 positioned beneath the valve cartridge 20. In the preferred embodiment the top outer portion of the valve cartridge frame 10 comprises the peripheral shape of the head on a bolt 13 so that the valve cartridge 20 may be turned therewith into a housing 42.

Figure 2:
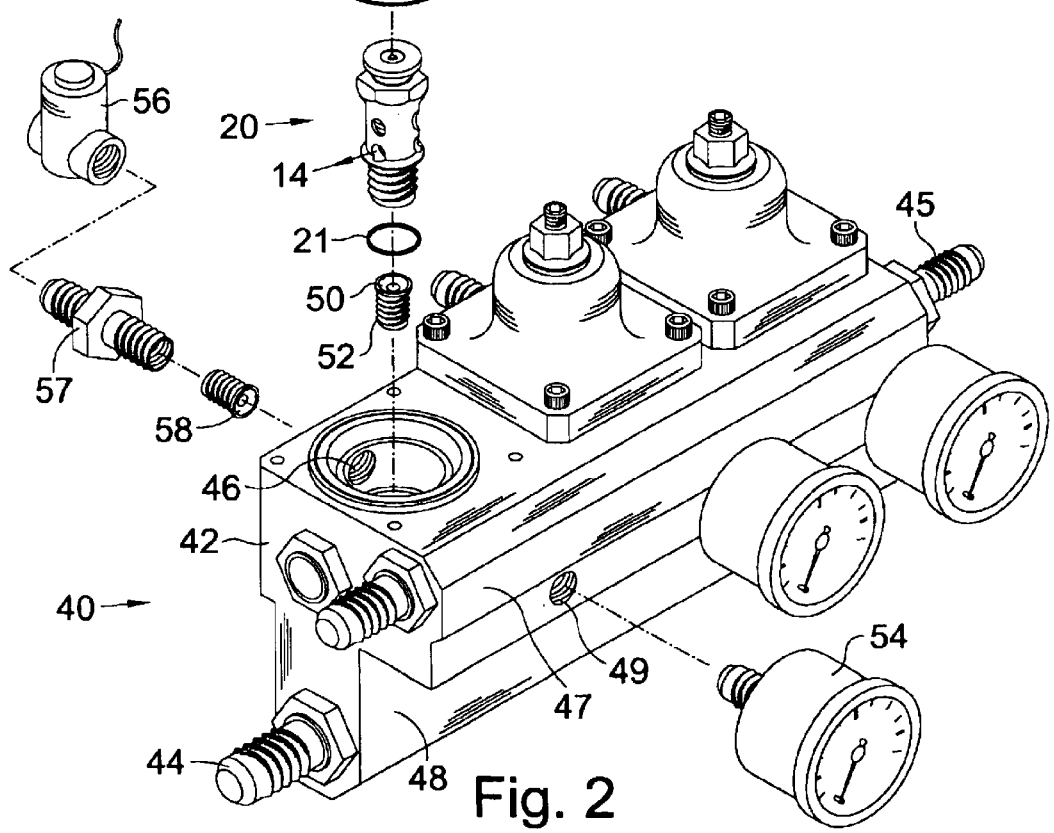
FIG. 2 is a partially exploded view of a multiple pressure regulator employing the replaceable valve cartridge shown in FIG. 1.

FIG. 2 is a partially exploded view of a multiple pressure regulator 40 employing the replaceable valve cartridge 20 shown in FIG. 1. The multiple pressure regulator 40 comprises an inlet opening 44 into the housing 42; an outlet opening 46 from the housing 42; and two valve cartridges 20 adapted to be removably held within the housing 42. Each of said valve cartridges 20 are similar to those described above. Difficulties in pressure regulation—which are compounded in a multiple pressure regulator 40—may be quickly rectified and pressure flow characteristics may be altered by removing and replacing the valve cartridge 20.

Most preferably the multiple pressure regulator 40 comprises an inlet manifold 48 to stabilize pressure fluctuations arising when substantial changes of flow 14 through one of the valve cartridges 20 occur. Additionally the multiple pressure regulator 40 comprises two jets 50 so that flow may be balanced through the two cartridges 20. Most preferably the jets 50 comprise a pipe thread 52 and the housing 42 is adapted to matingly receive said jets 50. Most preferably the housing 42 is plumbed so that a common feed return line 45 connected to outlet manifold 47, can recirculate flow to prevent pressure build up when necessary. Most preferably the housing 42 of the multiple pressure regulator 40 is also plumbed to receive a pressure meter 54 to read and monitor flow pressure on each valve cartridge 20. (In racing fuel pressure regulation it is necessary to monitor and control the pressure drop over each valve cartridge 20 as additional stages of fuel delivery from other valve cartridges 20 come on line.) Most preferably the regulator 40 is also plumbed to receive solenoids 56 which are used to control outlet flow 16 through each valve cartridge 20. In the most preferred embodiment of the invention jets 58 are used immediately preceding the solenoids 56 screw into a fitting 57 to additionally regulate the flow 14 from each valve cartridge 20.

In the application of racing fuel delivery systems the multiple pressure regulator 42 is especially advantageous. In installation the necessity for individual supply and return lines (not shown) is eliminated. The inclusion of the combination of an inlet manifold 48 and jets 52, 58 eliminate the significant expense of using and installing individual stage pumps (not shown) for each pressure regulator stage. Preplumbed ports 49 for pressure meters 54 save time in, and eliminate the turbulence and error associated with monitoring stage pressure fluctuations. The multiple pressure regulator 40 would not be feasible without the invention of the valve cartridge 20. There would be too many maintenance problems and too many disconnections to make to rectify these problems. Both of these inventions, the valve cartridge 20 and the multiple pressure regulator 40 have been produced and have had commercial success. They have been endorsed and recommended by award winning professional racers.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A multiple pressure regulator comprising:

a housing adapted to removably house two valve cartridges;

an inlet opening into the housing;

an outlet opening from the housing;

two valve cartridges adapted to be removably held within the housing each of said cartridges having a valve cartridge frame which carries and positions a valve seat, a valve member, a valve stem having a valve end portion adjacent to the valve member and an opposite end portion, and a valve bias means;

two flow jets to balance flow through the cartridges, and wherein said housing is adapted to matingly receive said jets; and, a valve stem positioning and adjusting means to adjust the pressure;

so that difficulties in pressure regulation may be quickly rectified and pressure flow characteristics may be altered by removing and replacing the valve cartridge.

2. A multiple pressure regulator as in claim 1 wherein the regulator comprises an inlet manifold to stabilize pressure fluctuations arising when substantial changes of flow through one of the valve cartridges occur.

3. A multiple pressure regulator as in claim 2 further comprising two flow jets so that flow through the two cartridges can be balanced; and wherein said housing is adapted to matingly receive said jets.

4. A multiple pressure regulator as in claim 3 wherein said jets comprise a male thread and wherein said housing has a mating female thread and is arranged so that the cartridge is seated above said jet.

5. A multiple pressure regulator comprising:

a housing adapted to removably house two valve cartridges;

an inlet opening into the housing;

an outlet opening from the housing;

two valve cartridges adapted to be removably held within the housing each of said cartridges having a valve cartridge frame which carries and positions a valve seat, a valve member, a valve stem having a valve end portion adjacent to the valve member and an opposite end portion, and a valve bias means;

a valve stem positioning and adjusting means to adjust the pressure; and, wherein said housing is plumbed so that a common feed return line can recirculate flow received through the inlet opening to prevent pressure build up when necessary;

so that difficulties in pressure regulation may be quickly rectified and pressure flow characteristics may be altered by removing and replacing the valve cartridge.

6. A multiple pressure regulator comprising:

a housing adapted to removably house two valve cartridges;

an inlet opening into the housing;

an outlet opening from the housing;

two valve cartridges adapted to be removably held within the housing each of said cartridges having a valve cartridge frame which carries and positions a valve seat, a valve member, a valve stem having a valve end portion adjacent to the valve member and an opposite end portion, and a valve bias means;

a valve stem positioning and adjusting means to adjust the pressure;

wherein said regulator is plumbed to receive a pressure meter to read and monitor flow pressure on each valve cartridge; and, wherein said regulator is plumbed to receive solenoids to control outlet flow through each valve cartridge;

so that difficulties in pressure regulation may be quickly rectified and pressure flow characteristics may be altered by removing and replacing the valve cartridge.

7. A multiple pressure regulator as in claim 6 wherein a bottom end portion of the cartridge frame is fitted with a male thread and wherein the housing is adapted with a mating female thread to screwably receive the cartridge.

8. A multiple pressure regulator as in claim 7 wherein the valve cartridge is seated in the pressure regulator housing on an o-ring to ensure a tight seal and wherein the top outer portion of the valve cartridge frame comprises the peripheral shape of the head on a bolt so that the valve cartridge may be sealably turned into the housing.

* * * * *